Dec. 2, 1952   R. J. GORMAN ET AL   2,620,176
COFFEE ROASTER
Filed Nov. 25, 1947   2 SHEETS—SHEET 1
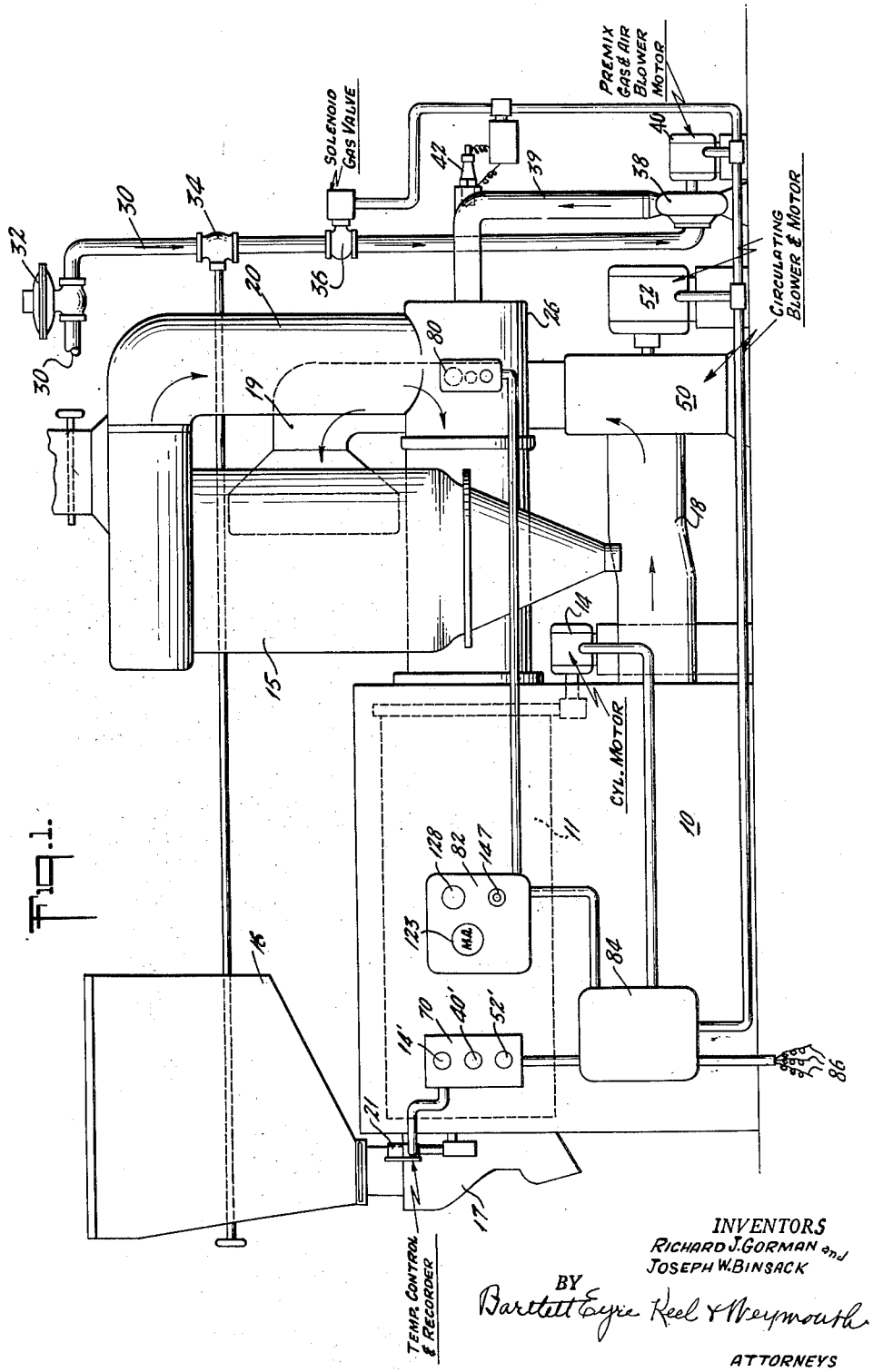
INVENTORS
RICHARD J. GORMAN and
JOSEPH W. BINSACK
BY Bartlett Eyrie Keel & Weymouth
ATTORNEYS

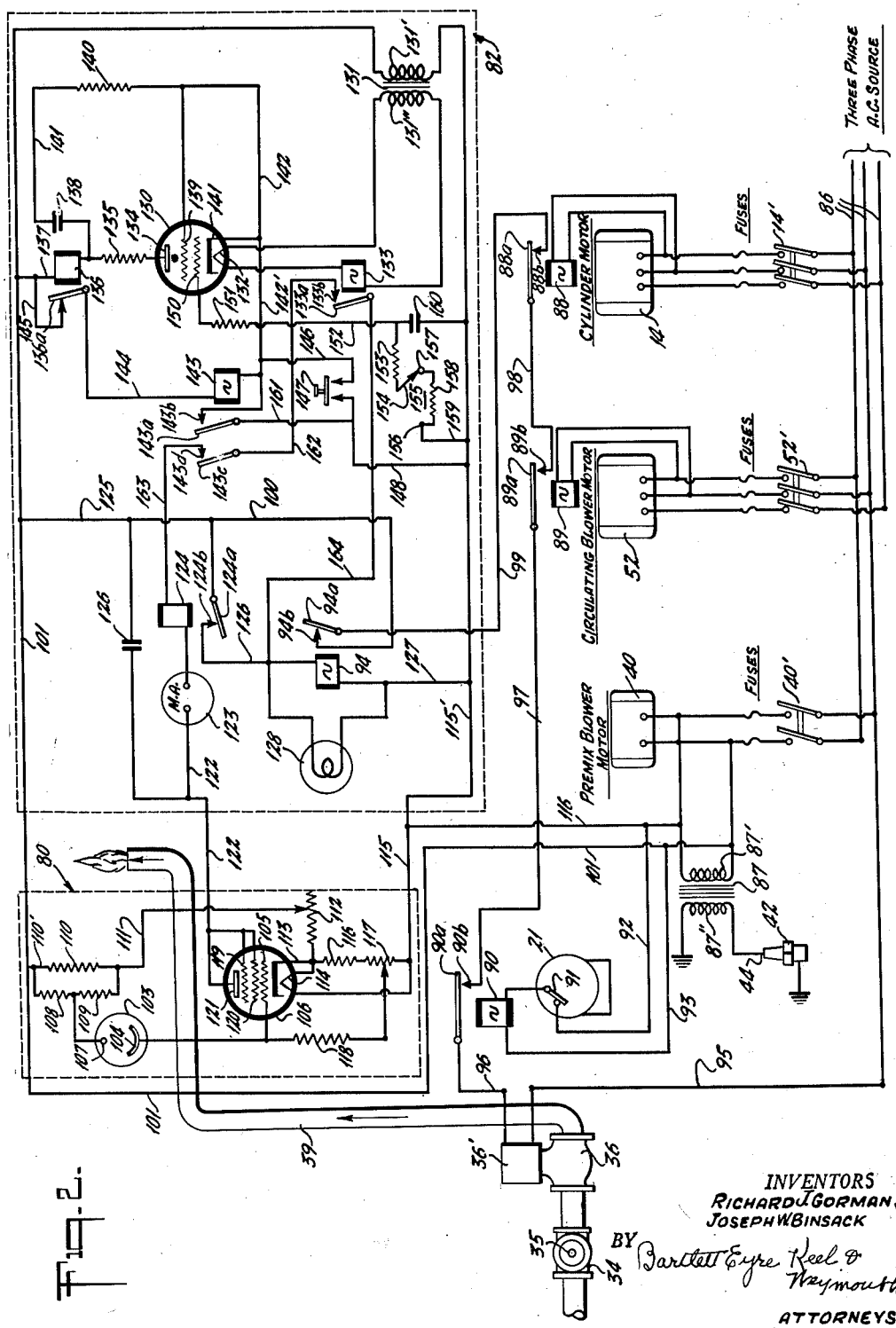

Patented Dec. 2, 1952

2,620,176

UNITED STATES PATENT OFFICE 2,620,176

COFFEE ROASTER

Richard J. Gorman, Glendale, and Joseph W. Binsack, Staten Island, N. Y., assignors to Beech-Nut Packing Company, Canajoharie, N. Y., a corporation of New York Application November 25, 1947, Serial No. 787,978

3 Claims. (Cl. 263—32)

This invention relates to coffee roasters.

The principal object of the invention is to provide a coffee roaster having novel and improved means for controlling the operation thereof.

This and other objects of the invention will become more apparent from the following description and accompanying drawings, in which—

Fig. 1 is a side view, partly diagrammatical, of a coffee roaster embodying the invention; and Fig. 2 is a schematic view showing certain details of the control system thereof.

The coffee roaster as illustrated includes an oven 10, a combustion chamber 26 and a particle collector tank 15. Within the oven 10 is a roasting drum 11 rotated by an electric motor 14 during the roasting process. For the purpose of loading and unloading coffee suitable means including a hopper 16 and a housing 17 communicating with the oven are also provided.

The heating means in this particular roasting equipment includes a premix blower 38 driven by an electric motor 40 and receiving gas from the supply line 30 for mixture with air and discharge through conduit 39 into the combustion chamber 26. A continuously operated spark plug 42 having electrodes 46 and 48 within the conduit 39 insures ignition of the gas-air mixture. During the roasting operation air is circulated through the combustion chamber 26 and oven 10 by a blower 50 and motor 52. The air is withdrawn from the oven 10 through conduit 18, delivered to the collector 15 through conduit 19 and returned to the oven by the conduit 20 and combustion chamber 26. A pressure regulator 32 and a manually controlled valve 34 both located in the gas supply line 30 control the supply of gas to the pre-mix blower.

To operate the equipment individual electric switches 14', 40' and 52' are provided for controlling the motor 14, 40 and 52, respectively, and electric power for the spark plug 42 is obtained through the switch 40' so that the spark plug will operate whenever the pre-mix motor 40 is running. The temperature of the oven during the roasting process is constantly recorded on a temperature measuring and recording instrument 21 positioned just below the hopper 16.

Considerable difficulty has heretofore been experienced in the roasting of coffee with this conventional equipment, such as, for example, the lack of uniformly good quality of coffee processed, occasional damage to the equipment itself or certain parts of it and dangers to the operating personnel.

In accordance with the present invention means are provided for ensuring uniform treatment for successive coffee roasts whereby the gas supply is interrupted in the event of failure of any one of the blowers or even extinguishment of the flame itself. Suppose, for instance, that the cylinder motor 14 should suddenly stop. Under conventional practice, the flame would continue and the surface layer of coffee in the drum would probably be burned in a relatively short time. With this invention, however, the flame is immediately turned off while the blowers remain in operation. This tends to reduce the temperature of the oven and avoid any possibility of burning the coffee. Similarly, should the circulating blower motor 52 or the premix motor 40 stop, the gas is again turned off, and the remaining apparatus continues to function normally. Means responsive to the gas flame are also employed to control the supply of gas so that sudden extinguishment of the flame will immediately interrupt the gas supply and prevent the discharge of unburned gas into the oven and chimney and thereby avoid endangering not only the apparatus itself but also personnel in the vicinity thereof.

As shown, the control comprises time delay and oven starting circuits within the box 82, gas flame detecting means 80, a temperature responsive switch associated with the temperature recorder 21, an electrically operated gas valve 36 and relays responsive to the operation of the several motors 14, 40 and 52 which may be located within a single housing 84. These units are interconnected with each other and with the motors by suitable electric conduits as illustrated. Each of the above relays is provided with contacts adapted to be closed when the switches 14', 40' and 52' are closed to energize their respective motors and these contacts are connected in series one with the other and with the electrically operated solenoid valve 36.

The flame detector 80 and the time delay means 82 cooperate to actuate a fourth relay within the housing 82. The contacts on this relay are connected in series with the contacts on the above mentioned relays and all must be closed before energy will be transmitted to the valve 36 to admit gas to the premix blower 38 and combustion chamber 26.

In starting the oven, closure of switches 14', 40' and 52' will start their respective motors operating and close the contacts and the relays in housing 82. A pushbutton 147 on housing 82 is then depressed to start the time delay system which closes its associated relay contacts for a predetermined period of time. Closure of this last set of relay contacts completes the circuit to operate the valve 36 and admit gas to the blower 38. Upon ignition of the gas in the combustion chamber and response of the photoelectric flame detector 80, the latter will independently operate the relay in the housing 82 so that gas will continue to flow through valve 36. Should, however, the gas fail to become ignited the relay will automatically open after the predetermined time and close the valve 36.

From the above description it is apparent each of the electrically operated parts of the oven must be in operation before gas can be admitted into the combustion chamber for ignition and if the flame becomes extinguished or the power to any one of the motors fails, one or more of the relays will open to interrupt the supply of gas.

Means are also provided in this control system to limit the temperature of the oven and includes a switch associated with the temperature indicator 21 adapted to open when the temperature reaches a predetermined value. This switch is connected in series with the coil of one of the relays and causes the relay to open when the temperature reaches the predetermined value. In this way a coffee roast cannot be subjected to excess temperature and uniform treatment will be accorded successive roasts. Moreover, since the gas is immediately interrupted upon failure of one of the motors or extinguishment of the flame, damage to the roast, the equipment or danger to personnel will be avoided.

This control system as well as the several motors and ignition systems receive electric power from a three-phase alternating current source connected with the conductors 86.

The cylinder and insulating blower motors 14 and 52, respectively, are of the three-phase alternating current type and are connected through triple pole single-throw switches 14' and 52' and appropriate fuses to the supply conductors 86 while the premix motor 40 is a single phase motor and is connected through its switch 40' and fuses to only two of the conductors 86. Since in the present arrangement the gas igniting means or spark plug 42 is to be operated continuously, the transformer 87 supplying ignition voltage to the spark plug has its primary 87' connected directly across the leads supplying the motor 40 so that both the motor 40 and the spark plug 42 are operated simultaneously by closure of the switch 40'. The transformer 87 is of conventional construction and has a high voltage secondary 87'' having one side connected to the terminal 44 of the plug 42 and the other side connected to the base or ground side of the plug 42 by the use of suitable ground connections.

Associated with the motors 14 and 52 are single pole, single-throw relays 88 and 89, respectively, the coils of which are connected across two of the three connectors supplying their respective motors and operate to close their contacts 88a—88b and 89a—89b when the switches 14' and 51' are closed to energize the motors. A relay 90 having contacts 90a and 90b is connected in series with a switch 91 housed within the temperature control mechanism 21 and operable to open when the temperature exceeds a predetermined maximum, is connected in parallel with the primary 87' of the transformer 87 by leads 92 and 93 so that when the premix motor switch 40' is closed to energize the premix motor 40 and the primary winding 87' of the transformer 87 the relay coil 90 will also be energized to close its contacts 90a and 90b. A fourth relay 94 within the control box 82 operates in response to the photoelectric mechanism to be described to close its contacts 94a and 94b.

For normal operation of the oven, each of the relays 88, 89, 90 and 94 must be actuated to energize the solenoid valve 36 so that it will open and admit gas to the premix blower 38. The circuit for accomplishing this action includes a lead 95 connecting one side of the winding 87' to one side of the solenoid valve winding 36' of the valve 36, and the lead 96 connecting the other side of the valve to the relay 90a. The remainder of this circuit consists of a series arrangement including contact 90b, lead 97, relay contacts 89a and 89b, the lead 98, relay contacts 88a and 88b, the lead 99, relay contacts 94a and 94b, and the leads 100 and 101 to the other side of the primary winding 87' of the transformer 87. Only under the condition, therefore, where each pair of relay contacts referred to above is closed will the valve 36 be operated to open and permit the supply of gas through conduit 39 to be ignited and heat the oven.

As previously mentioned, a photoelectric eye is arranged to view the heating flame in the cylindrical housing 26 and is contained within the box 80 and is denoted in Fig. 2 by the numeral 103. The response of the electric eye is amplified by the tube 106 and operates to actuate the relay 94 as will become apparent.

More particularly the cathode 104 of the tube 103 is connected directly to the control grid 105 of the amplifier tube 106, and its anode 107 is connected to the center terminal of a pair of series connected resistors 108 and 109 which are connected in parallel with a filament voltage dropping resistor 110. The upper terminal 110' of the resistor 110 is connected to the lead 101 which, as previously described, connects with one of the supply conductors 86. The other side of the resistor 110 is connected by means of lead 111 to a rheostat 112 which in turn connects with the cathode 113 to one side of the filament 114 of the tube 106. The other side of the filament 114 is returned to one of the other conductors 86 by means of the leads 115 and 116. Since the leads 101 and 116 supplying the electronic circuits in the boxes 80 and 82 are connected to the winding 87', the supply of energy to those circuits is under the control of switch 40'.

The cathode 113 of the amplifying tube 106 is connected to one side of filament 114 and then to the lead 115 through a resistor 116 and a potentiometer 117. The grid 105 is connected to the tap on the potentiometer 117 through a resistor 118 so that the bias on the grid 105 can be adjusted for proper operation of the tube 106. The tube 106 is operated as a triode with its suppressor grid 119 and its screen grid 120 connected to the plate 121, and the plate circuit including the plate 121 is completed through the lead 122, milliammeter 123, the relay coil 124 and the lead 125 to the conductor 101. A condenser 126 is connected between the leads 122 and 125 to filter the voltage applied to the D. C. relay 124 since the current in the plate circuit of tube 106 is of a pulsating character because of the use of alternating current in the plate circuit thereof.

Under normal operation of the oven the flame produced by combustion of the gas in the cylinder 26 creates sufficient light to actuate the photocell 103 and cause the tube 106 to draw current in its plate circuit. This current is registered on the milliammeter 123 and is also sufficient to actuate the relay 124 to close its associated contacts.

During the normal operation of the device wherein the tube 106 is operated by the photocell 103 to close the relay contacts 124a and 124b, a circuit is completed from the lead 125 through the contacts 124a and 124b through lead 126, the relay coil 94 and lead 127 to the other side of the power supply 115'. This actuates the relay 94 to close its contacts and, assuming the other relay contacts connected in series with the contacts 94a and 94b are also closed, gas will be continuously delivered into the conduit 39. A pilot light 128, connected in parallel with the relay coil 94, produces a visual indication of the actuation of the relay 94.

The time delay starting means for the oven whereby gas is delivered to the supply conduit 39 for ignition and operation of the photocell 103 includes a gas-filled "Thyratron" tube 130 located in the control box 82. The filament 132 of this tube is heated by a suitable filament transformer 131 having its primary 131' connected between the voltage supply lines 101 and 115' and its secondary 131" connected to the filament 132. An A. C. relay 133 is connected in series with one of the filament leads to the filament 132 and operates to close its contacts 133a and 133b when the filament is energized. The plate circuit of the tube 130 includes a plate 134, a series resistor 135 and a relay 136 and lead 137 to the supply line or conductor 101. A condenser 138 is connected in parallel with the D. C. relay 136 and operates in a manner similar to condenser 126 in that it smoothes the intermittent plate voltage of tube 130 operating the relay 136. The screen grid 139 is connected to the supply lead 134 through a series resistor 140, a lead 141 and lead 137. The cathode 141 of the tube 130 is connected in the first instance to the screen grid 139 by the lead 142 and is also connected through the lead 142' to the A. C. relay 143. The other side of the relay 143 is connected through the lead 144 through the normally closed contacts 136a and 136b of the relay 136 and through leads 145 and 137 to the supply conductor 101. The completion of the circuit for cathode 141 to the supply conductor 115' is accomplished through the lead 146, the pushbutton switch 147 and lead 148 so that closure of the switch 147 to complete the cathode circuit will also actuate the relay 143 to close its normally open contacts 143a—143b and 143c—143d. The control grid 150 of the "Thyratron" tube 130 is connected through a series resistor 151, the lead 152, and a second series resistor 153 to the contact arm 154 of the switch 155. The switch 155 includes two contacts 156 and 157 having a resistor 158 connected therebetween. The switch contact 156 is connected to the supply lead 115' by the lead 159. It is evident therefore that the grid 150 may be returned to ground through a series connection of the three resistors 151, 153 and 158 by setting the contact arm 154 on the contact 157, or in the alternative, by setting the contact arm 154 on the contact 156 the return to ground can be accomplished merely through a series connection of the resistors 151 and 153. A condenser 160 is connected between the lead 152 and supply conductor 115'. The relay contacts 143a and 143b are connected by means of the leads 161 and 142'—146 to bridge the push-button 147. The contacts 143c and 143d are connected in series with the contacts 133a and 133b of the relay 133 by means of the lead 162 and these two sets of contacts are connected to bridge the contacts 124a and 124b of the relay 124 by means of the leads 163 and 164.

Since the operation of this time delay mechanism will best be understood in connection with the operation of the device as a whole, we will now describe in detail the procedure for starting and operating the oven.

The switches 40', 52' and 14' are first closed. These switches start their respective motors and energize the relays associated therewith to close their respective contacts. For instance, closure of the switch 40' will energize the premix motor, the ignition transformer 87 and the A. C. relay 90 through the temperature control contacts 91, and closure of the switches 52' and 14' will operate the relays 89 and 88, respectively, to close their contacts. Closure of the switch 40', as previously described, will also energize the control circuits in the box 80 and 82, heating the filament 114 of the tube 106 and the filament 132 of the tube 130. Heating filament 132, as previously pointed out, will also actuate the relay 133 to close its contacts 133a and 133b. Since there is no flame in the heating chamber 26 the electric eye 103 will not be actuated and, therefore, relay 124 will remain open. Since the contacts 143c and 143d on the relay 143 are also open, a circuit is not completed through the relay 94, and, therefore, its associated contacts 94a and 94b will also remain open.

It is apparent that although the relays 88, 89 and 90 have been actuated, relay 94 must also be actuated before the solenoid 36' on the valve 36 can be energized to open and admit gas into the conduit 39.

The next step in initiating the operation is to open the manually operated valve 35. To operate the valve 36 so that gas will be admitted to the premix blower 38 the pushbutton 147 is closed, energizing the relay 143 through the contacts 136a and 136b of the relay 136. Since the contacts 143a and 143b short circuit the switch 147, momentary pressing of the switch or pushbutton 147 is all that is required since these contacts then act as holding contacts for the relay. Contacts 143c and 143d are also closed through energization of the relay 143, and a circuit will be completed from lead 101, leads 125 and 163, lead 162, the relay contacts 143a and 143d, the lead 164, the relay 94 and the pilot light 128 in parallel and lead 127 to the other supply conductor 115. This will energize the relay 94 to close its contacts and complete the circuit to the solenoid valve 36, causing it to open and admit gas into the conduit 39. Since the cathode circuit of the tube 130 is also completed to ground by closure of the contacts 143a and 143b, the tube 130 is placed in an operating condition.

The tube 130 is arranged in a time delay circuit and functions after a predetermined interval after pressing of pushbutton 147 to draw plate current and actuate relay 136 to open its contacts and deenergize control relay 143. This is accomplished by resistors 153 and 158 in combination with the capacitor 150 to determine the time when a given grid voltage is applied to the tube 150 and cause it to draw its maximum plate current. Since a "Thyratron" tube can be said to have only two operating conditions—that is, a condition where it draws maximum plate current and a condition where it draws a negligible amount of plate current—it is only necessary to control the time in which the critical grid voltage is applied to the grid to cause it to change from a condition of nonconduction or minimum plate current to a condition of conduction where it draws its maximum plate current. As mentioned, this time is controlled by the relationship of the resistors 153 and 158 to the condenser 160, and for present purposes has been adjusted to give a delay of one second when arm 154 is on contact 157, and two seconds when arm 154 is on contact 156. Assuming the arm 154 to be on contact 157, a time delay of about two seconds will be obtained before the tube 130 becomes conducting to actuate the relay 136 in its plate circuit.

After the pushbutton 147 has been operated to close the contacts on relay 143 the gas is permitted to enter the cylindrical chamber 26 for a period of time determined by the time delay characteristics of the grid circuit of the grid 130. When the voltage on the grid 150 has attained or passed its critical value, the tube 130 becomes conducting and draws current through coil 136 and the resistor 135. This action operates to open the relay contacts 136a and 136b and deenergize the relay 143, whereupon its associated contacts are opened. As previously pointed out, the contacts 143c and 143d in series with the contacts 133a and 133b of the relay 133 are connected across the relay contacts 124a and 124b of the relay 124. If during the time immediately following depression of the button 147 but prior to the time that the tube 130 becomes conducting, the gas emitted in cylinder 26 for heating the furnace has been properly ignited by the spark plug 42 and the photocell 103 has responded to such ignition and burning so as to cause the tube 106 to draw plate current and actuate the relay 124 to close its associated contacts, then the opening of the contacts 143c and 143d of the relay 143 will not operate to deenergize the relay 94, the contacts of which are in the control circuit of the gas valve 36.

However, should the gas fail to ignite within the time delay period, the contacts of relay 124 will remain open, and opening of the contacts 143c and 143d will deenergize the relay 94, whereupon its contacts will open and deenergize the solenoid 36' to close the valve 36 against further delivery of gas to the conduit 39. Since each of the several elements in the electronic circuit must be actuated to provide a continuous supply of gas it is apparent that failure of any part of the circuit or of the voltage supplying any one of the individual motor circuits will immediately act to interrupt the gas supply so that no damage to the material being treated will be incurred. For instance, if the photo tube 103 fails to operate, relay 124 will immediately be deenergized. A similar reaction will occur if, for instance, the filament current is interrupted in the filament 114 of the tube 106 by reason of failure of the filament itself or the associated voltage dropping resistors. Likewise, if the filament 132 burns out for any reason or the voltage supply fails, the relay 133 will be deenergized and it will be impossible to restart the furnace if for any reason the gas supply is interrupted until, of course, the tube is replaced. Furthermore, during the operation of the furnace, if the temperature should exceed a predetermined value, the switch 91 associated with the temperature indicator 72 is arranged so that it will open, break the circuit to the relay 90 and deenergize that relay. This will cause its contacts 90a and 90b to open, and since they are in the control circuit operating the solenoid gas valve 36, the gas supply will be interrupted and the heating process will be immediately stopped.

By the foregoing invention, proper starting as well as proper continued operation of the roaster after it has been started is ensured, since the various electrical control devices employed are arranged so that either failure of those devices or of the roaster motors will interrupt the supply of gas and thereby immediately indicate to the operator that some part or parts have failed. Because the circuits are arranged in the manner described predetermined steps must be followed in starting the oven, so that it is impossible to omit any one or more of the steps in the starting procedure which might result in damage to the coffee being treated. This is particularly important in roasting coffee because a batch or roast can be very quickly and easily burned by omitting, for instance, to turn on the circulating blower prior to ignition of the gas. The device also maintains a constant check on the temperature of the oven and the gas flame and immediately causes the gas to be turned off in the event of any departure from normal or desired operation.

Having described my invention, what is claimed is:

1. A roaster of the class described comprising an oven and a combustion chamber, means including a premix blower and electric motor for mixing combustible gas and air and discharging it into the combustion chamber, an electric motor driven blower for circulating air through the combustion chamber and oven, temperature indicating means on said oven, a motor driven roasting cylinder within the oven to hold the coffee to be roasted, and means including a spark plug and transformer for igniting the gas in the combustion chamber, in combination with control means comprising a normally open relay connected with each of said motors and operable to close its contacts upon the application of energy to its associated motor, said relay associated with said premix motor being connected with the temperature indicating means, an electric eye including an amplifier tube positioned to view the ignited gas, and at least one normally open relay associated with said tube and operable to close its contacts upon detection of the heating flame by said photocell, a solenoid valve in said gas supply, a series connection between the contacts on each of the aforesaid relays, and the solenoid gas supply valve so that upon operation of each of said normally open relays the valve will be energized to open and admit gas to the oven, time delay means having at least one relay and operable upon the initiation of said heating process to actuate the contacts on said photocell relay and permit gas to be discharged into the combustion chamber and ignited by the spark plug whereupon ignition of the gas and response of the photocell thereto to actuate its associated relay will maintain the contacts in the closed position and permit gas to flow without reliance on the time delay device.

2. A roaster of the class described comprising an oven, a combustion chamber associated with the oven, means for supplying fuel to the combustion chamber having a control valve, separately operable means for feeding air to the combustion chamber and for agitating the contents of the oven, manually operated means for separately throwing said feeding and agitating means into operation, temperature control means for operating said valve to interrupt the fuel supply upon the attainment of a predetermined temperature in the oven, in combination with means acting automatically to open said valve to supply fuel to the combustion chamber upon both of said air feeding and agitating means being thrown into operation and to maintain said fuel valve open contingent upon the ignition and continued burning of the fuel and the continued operation of the feeding and agitating means.

3. A roaster of the class described comprising an oven, fuel supply means including a valve and circuit therefor operable to control the flow of fuel to the oven, a plurality of separately controlled means associated with the oven including fuel ignition means, air feeding and circulating means, and agitating means for the coffee to be roasted, and temperature control means connected to said valve to interrupt the fuel supply upon the attainment of a predetermined temperature, in combination with individual means responsive to said manually controlled means and connected to the valve, said individual means being operated upon initiation of its associated controlled means, a combustion responsive device connected with the valve and including time delay means, said valve circuit being completed upon the initiation of said manually controlled devices and time delay means to supply fuel to the oven for ignition, whereupon ensuing combustion detected by the combustion responsive means maintains a complete circuit to the valve and thereby continues the supply of fuel to the oven.

RICHARD J. GORMAN.
JOSEPH W. BINSACK.

REFERENCES CITED

The following references are of record in the file of this patent:

UNITED STATES PATENTS

| Number | Name | Date |
|---|---|---|
| 1,824,057 | Robertshaw et al. | Sept. 22, 1931 |
| 1,945,652 | Martin | Feb. 6, 1934 |
| 2,081,091 | Kumpel | May 18, 1937 |
| 2,092,657 | Smith | Sept. 7, 1937 |
| 2,201,385 | Woodson | May 21, 1940 |
| 2,396,898 | Storme | Mar. 19, 1946 |